No. 740,973. PATENTED OCT. 6, 1903.
A. E. DOMAN.
SYSTEM OF ELECTRICAL DISTRIBUTION.
APPLICATION FILED MAY 31, 1902.
NO MODEL.

WITNESSES:

INVENTOR
Albert E. Doman
BY
Smith & Davison
ATTORNEYS.

No. 740,973.                                          Patented October 6, 1903.

UNITED STATES PATENT OFFICE.

ALBERT E. DOMAN, OF ELBRIDGE, NEW YORK, ASSIGNOR TO THE ELBRIDGE ELECTRICAL MANUFACTURING COMPANY, OF ELBRIDGE, NEW YORK, A CORPORATION OF NEW YORK.

SYSTEM OF ELECTRICAL DISTRIBUTION.

SPECIFICATION forming part of Letters Patent No. 740,973, dated October 6, 1903.

Application filed May 31, 1902. Serial No. 109,691. (No model.)

*To all whom it may concern:*

Be it known that I, ALBERT E. DOMAN, of Elbridge, in the county of Onondaga, in the State of New York, have invented new and useful Improvements in Systems of Electrical Distribution, of which the following, taken in connection with the accompanying drawings, is a full, clear, and exact description.

This invention relates to a system of electrical distribution for connecting and disconnecting different sources of electric energy, being particularly applicable for use in charging storage batteries from a separate source of electric energy, as a dynamo, in which the electric motive force varies or entirely ceases at regular or irregular periods.

One of the objects of my invention is to provide a simple, compact, and efficient means for automatically connecting and disconnecting an electric charging-circuit to and from a source of electric energy, as a battery, the automatic operation of the switch or circuit-controller being dependent upon the comparative voltages of the current available for charging and battery—that is, when the electric motive force is equal to or above that of the battery the charging-circuit is automatically closed through the battery, and when the voltage of the charging-current is below that of the battery the charging-circuit is automatically cut off from the battery.

Another object is to prevent the backflow of the battery-current through the dynamo when its current strength is in excess of that of the dynamo.

A further object is to render the operation of the switch sensitive and positive, and to prevent any appreciable waste of electric energy in the charging-circuit, and to utilize any excess of the electric energy above what is required for the work for which my device is intended, or for any other useful purpose or purposes—as, for instance, the lighting of incandescent lamps.

Further objects and purposes of my invention will be obvious from the description and upon reference to the accompanying drawings.

Figure 1:
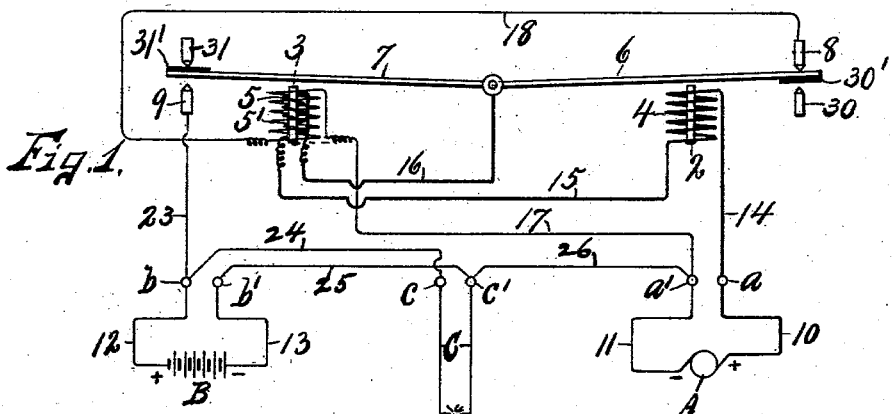
Figure 2:
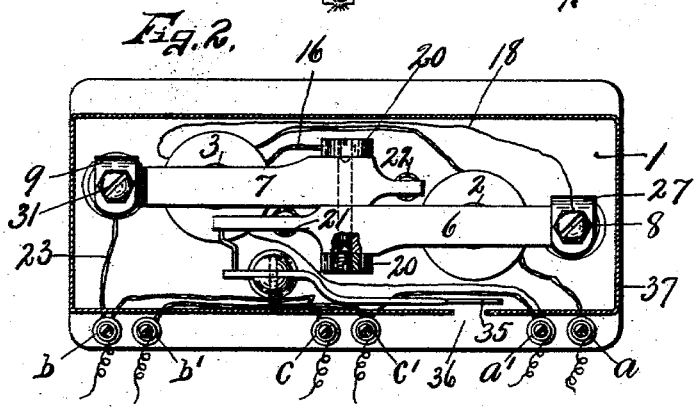
Figure 3:
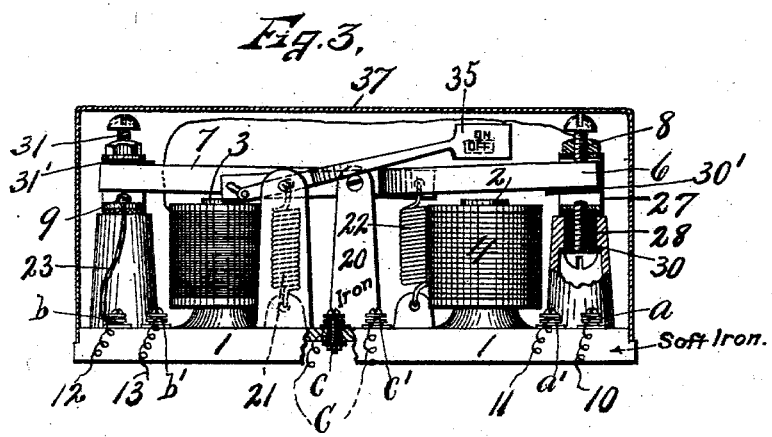

Referring to the drawings, Figure 1 is a diagrammatic view of my invention and its connection with a dynamo and battery, showing also a working circuit connected to the battery and dynamo. Fig. 2 is a top plan of my invention, the inclosing case for the working parts being shown in section. Fig. 3 is an elevation of the parts seen in Fig. 2, the inclosing case and parts of the device being shown in section.

Similar reference characters indicate corresponding parts in all the views.

My invention is especially adapted for use in connection with a dynamo and battery for igniting the explosive mixture of vapor-engines, the battery being used individually for this purpose until the dynamo produces a current of sufficient strength equal to or above the current strength of the battery to charge the battery, whereupon the dynamo is automatically and electrically connected to the battery in the manner hereinafter described.

In the drawings I have shown diagrammatically, Fig. 1, two sources of electric energy, as a dynamo A and a battery B, and suitable electric circuits connected thereto for the purpose of demonstrating the utility of my invention, which is also shown diagrammatically in Fig. 1 and mechanically in Figs. 2 and 3.

I have thus briefly outlined the purposes and general utility of my automatic switch or cut-out device as used in connection with a dynamo and storage battery, and it will be evident that the essential elements of this device may be assembled in any suitable manner and located in a position in proximity to or remote from the sources of electric energy, and in Figs. 2 and 3 I have shown these essential elements as mounted upon a suitable base or frame 1 and consisting, essentially, of electromagnet-cores 2 and 3, coils or windings 4, 5, and 5', armatures 6 and 7, and contact-terminals 8 and 9.

Mounted upon the base 1 and insulated therefrom in any desired manner are several pairs of binding-posts $a$ and $a'$, $b$ $b'$, and $c$ $c'$, the binding-posts $a'$ $a'$ of one pair being connected by conductors 10 and 11 to the opposite poles of the dynamo A. The binding-posts $b$ $b'$ are connected by conductors 12 and 13 to the opposite poles of the battery B, and the binding-posts c c' are connected to suitable line-wires or conductors C of the working circuit, in which may be connected the sparking terminals for igniting the explosive mixture of a vapor-engine.

The cores 2 and 3 are formed of magnetizable metal, such as soft iron, and are secured directly to the base 1, which is also formed of soft iron and serves to yoke the cores 2 and 3 to each other, thereby forming a part of the magnetic circuits of said core under certain conditions hereinafter specified.

The coil 4 consists of one or more (usually a small number) of windings of comparatively coarse wire surrounding the core 2, one end of which winding is electrically connected to the terminal a by a wire 14, and the other end is electrically connected to the coil 5 by a wire 15. The coil 5 also consists of one or more windings of comparatively coarse wire surrounding the core 3, one end being electrically connected to the coil 4 through the wire 15, and its other end 16 is electrically connected to the armatures 6 and 7 in a manner hereinafter described.

The coil 5' consists of a suitable number of windings of comparatively fine wire, also surrounding the core 3 in such manner as to energize the core 3 independently of the coil 5, one end of said coil 5' being electrically connected to one pole of the dynamo A, or rather to the binding-post a', by a conductor 17, and its other end is connected by a wire or other conductor 18 to a terminal 8, which is normally in electrical connection with the armature 6, and therefore is normally electrically connected to the wire 16 of the coil 5.

It is thus apparent that the coils 5 and 5' form two substantially independent electromagnets having a single core 3 and that the coil 5' is connected in shunt to the dynamo A. It is also apparent that a complete circuit is produced from the dynamo, which normally includes the coils 4, 5, and 5' and under all circumstances includes the coils 4 and 5, the coil 5' being cut out of the circuit at intervals in a manner hereinafter described. These coils 4, 5, and 5' are preferably wound so as to harmonize in their magnetic effects, the windings 4 and 5 being of comparatively coarse wire with only a few convolutions in the winding 4 and the winding 5' being of a large number of convolutions of comparatively fine wire. The current flowing in the coil 5 of fine wire is small, and its magnetic motive force is also too small in its effect upon the winding 4 to operate the armature 6 of the core 2; but at the same time the magnetic motive force in the core 3 may be sufficient to operate its armature 7 to contact with the terminal 9.

This operation only takes place when the current strength of the dynamo A is equal to or in excess of the current strength of the battery B, and when the armature 7 is attracted by the core 3 electrical connection is made with the terminal 9.

As previously stated, the supporting base or frame 1 is formed of conducting magnetic material, as soft iron, and the armatures 6 and 7 are electrically connected to each other and to said frame through the medium of an upright standard 20, which forms a portion of the supporting-frame 1. These armatures 6 and 7 are pivotally connected to the standard 20, the armature 6 being normally held in electrical connection with the terminal 8 by any suitable means, as a spring 21, and the armature 7 is normally held out of contact with the terminal 9 by similar means, as a spring 22. This terminal 9 is electrically connected to one pole of the battery B through the medium of a wire 23, the binding-post b, and wire 12, and it is also connected to one of the wires of the working circuit C through the medium of a wire 24 and the binding-post c. The other pole of the battery B is connected to one pole of the dynamo and to the other line of the working circuit through the medium of wire 25, the binding-post c', and an additional wire 26, the binding-post a', and wire 11.

When the current strength of the dynamo is equal to or in excess of the current strength of the battery, the core 3 is energized sufficiently to attract the armature 7 and electrically connect the same with the terminal 9. This operation completes another circuit from the dynamo A through the wires 10 and 14, coil 4, wire 15, coil 5, and wire 16 to the frame 1 and thence to the armature 7, terminal 9, wires 23 and 12, to one pole of the battery B, the current then passing through the wires 13, 25, 26, and 11 to the other pole of the dynamo. Immediately upon the completion of the circuit just described the core 2 is sufficiently energized by the current passing through the coil 4 to attract the armature 6 and break its electrical connection with the terminal 8, thereby cutting out the shunt-coil 5' of fine wire.

As previously stated, the armatures 6 and 7 are pivoted independently of each other to the upright standards 20, the springs 21 and 22 being connected to the frame 1 and to the armatures 6 and 7 at points on opposite sides of their pivots from their respective terminals 8 and 9, so that the outer ends of the armatures are normally held in their uppermost position, the armature 6 being normally held in contact with the terminal 8, which is usually adjustable in a bracket 27 and forms a stop for limiting its upward movement, said armature 6 being limited in its downward movement by a suitable adjustable stop 30, the terminal 8 and stop 30 serving to regulate the proximity of the armature to its core 2, and I preferably provide said armature 6 with an abutment 30' of insulating material for insulating the same from the stop 30 when in contact therewith, although this stop is usually mounted in an insulating-bushing 28 provided on the frame 1.

The upward movement of the armature 7 is limited by an adjustable stop 31, and the terminal 9 is also adjustable for regulating the movement of the armature 7, which is also provided with an insulating-piece 31' for engaging the stop 31 and preventing any liability of short circuits or leakages of the electrical current.

I have thus far described the operation of connecting the dynamo to the battery for the purpose of recharging the same, and it is evident that when the current strength of the dynamo is equal to or exceeds that of the battery the armatures 6 and 7 are attracted by their respective cores 2 and 3, first closing the dynamo-circuit through the battery and then cutting out the shunt-coil 5', and that when this shunt-winding is cut out when the battery is being charged there is no waste of the current in said shunt-circuit, and inasmuch as the total energy generated by the dynamo for the purpose of igniting the explosive mixture of the vapor-engine is generally small the total percentage of the electric energy saved is quite large and may be used to advantage for other useful work, such as lighting incandescent lamps. The springs 21 and 22 are so adjusted that as soon as the current strength of the dynamo falls below that of the battery the armatures 6 and 7 are returned to their normal positions, and it is obvious that this operation serves to break the electrical connection between the battery and dynamo and prevents any reverse flow of the battery-current through the dynamo.

As long as the voltage of the dynamo A equals or exceeds that of the battery B the switch will remain with the armatures 6 and 7 both held down by the attraction of the cores 2 and 3; but should the voltage of the dynamo fall to a point equal to or below that of the battery for any reason the current flowing in the coils 4 and 5 will fall to zero and the armatures will be released, so that the armature 6 will again be in electrical connection with the coil 5' and the electrical circuit through the battery from the dynamo will be broken by the movement of the armature 7 out of contact with the terminal 9, this operation being repeated as often as variations in the comparative voltages of the dynamo and battery occur to make it necessary.

In practice I have generally adjusted the allowable movement of the armatures 6 and 7, the tension of the springs 21 and 22, and the proportions of the windings 4, 5, and 5' so that when the switch operates to disconnect the battery the armature 6 will not be earlier in making contact with the terminal 8 than the armature 7 is in breaking contact with the terminal 9. In fact I prefer to adjust the parts so that the operation of the armature 6 will be a little later than the operation of the armature 7, so that the current from the storage battery B cannot flow back through the armature 6 and terminal 8 and then to the coil 5'. If the current did thus flow, it would have a tendency to hold the armature 7 in contact with the terminal 9, and therefore allow the storage battery to discharge itself through the dynamo A.

Another advantage of cutting out the shunt-winding 5' is that as in practice the battery B and dynamo D are really connected in parallel, as shown in the drawings, the shunt being connected directly across the positive and negative poles would remain energized by the current from the battery even if the dynamo were entirely disconnected; but with my switch as the shunt is disconnected the current cannot flow back through the dynamo unless it be through the series winding of the switch, and before the current can flow back it must fall to zero and then start to flow in an opposite direction.

When or before the current reaches zero, the armatures 6 and 7 will be moved from the cores 2 and 3 by the action of the springs 21 and 22 without depending upon the current of a shunt to act differently with a series current flowing back from the battery through the switch to the dynamo or upon a polarized magnet of any kind.

Another feature of my invention is the magnetic circuit which results from the energizing of the core 3 when the armature 7 is attracted to the core 3, this magnetic circuit being from the one pole of the core 3, through frame 1, standard 20, and the armature 7 to other pole of core 3. It will be noted, however, that when both armatures are attracted by their respective cores 2 and 3 another magnetic circuit is established independently of the standard 20—that is, the circuit is from corresponding poles of the cores 2 and 3, through the frame or iron bed 1, and to the opposite poles of the cores through the armatures 6 and 7.

In the operation of my invention, assuming that my improved switch is applied to the ignition of an explosive mixture of a vapor-engine in which the battery B is primarily used to produce the igniting-spark and it is desired to recharge the battery when necessary by a dynamo-electric circuit and to utilize the dynamo-current for producing said igniting spark, as in the first instance, the battery-current is permitted to flow from one pole of the battery through the wires 12 and 24 to one of the lines connected to the binding-post c of the working circuit, the current returning to the other binding-post, c', through the wires 25 and 13 to the other pole of the battery, this current being controlled by a suitable switch not necessary to herein illustrate or describe. The dynamo is usually actuated by the engine, which has previously been started by the ignition of the explosive mixture from the battery B. When the dynamo has acquired a speed sufficient to produce a current of equal or greater electromotive force than the battery, the dynamo-current passes from one of the poles of the dynamo through the coils 4, 5, and 5' and back to the other pole of the dynamo. This circuit being complete from the dynamo energizes the core 3, attracting the armature 7 and causing an electrical contact between said armature and the terminal 9, whereupon the second circuit is established through the battery for recharging the same, and immediately upon the completion of the second circuit the core 2 is energized to attract the armature 6 for the purpose of disconnecting said armature 6 from the terminal 8 and cutting out the shunt-winding 5. In this condition of the armatures a magnetic circuit is established in the manner previously described, and these circuits serve to retain the armatures in their attracted positions as long as the strength of the dynamo-current is equal to or exceeds the strength of the battery-current. Under such conditions the dynamo-current through the battery with the shunt-coil 5' cut out may be utilized for producing the spark in the explosion-chamber of the engine, or rather within the working circuit C, in which case the dynamo-current flows from one pole of the dynamo A, through the wires 10 and 14, coils 4 and 5, armature 7 and terminal 9, wires 23 and 24, thence through the working circuit, and back to the dynamo through the wires 26 and 11. At the same time a portion of the current may be flowing through the battery B in the manner previously described.

In order that the attendant may readily determine whether the switch is on or off, I have provided an indicator 35, which is mounted upon a lever and connected to one of the armatures, as the armature 6, in such manner that when the armature is up the indicating character "Off" is registered with an aperture 36 in the wall of an inclosing case 37, and when the armature is attracted to the core 2 the indicating character "On" is registered with said opening.

The operation of my invention will now be readily understood upon reference to the foregoing description and the accompanying drawings, and it will be noted that some change may be made in the windings 4, 5, and 5' and also in the other elements of my invention without departing from the spirit thereof.

Having thus described my invention, what I claim, and desire to secure by Letters Patent, is—

1. In a system of electrical distribution, a storage battery and a dynamo electrically connected thereto to charge the battery, electromagnets and a normally open electric switch in the charging-circuit, a shunt-winding for one of the magnets receiving current from the dynamo, and a normally closed electric switch in the shunt-circuit, said magnets operating the switches to close the charging-circuit and cut out the shunt-circuit.

2. In a system of electrical distribution, a storage battery and a charging-generator therefor, an open electric switch in the charging-circuit, and a closed electric switch in shunt with the charging-circuit and electrically operated by current through the shunt-circuit to close the open switch and to open the closed switch.

3. A system of electrical distribution comprising a storage battery and a charging-generator therefor, electromagnets having windings of comparatively coarse wire in the charging-circuit, one of the magnets including a winding of comparatively fine wire in shunt with the charging-circuit, a normally closed switch in the shunt-circuit, a normally open switch in the charging-circuit, said switches being operated automatically by the electromagnets to first close the charging-circuit and to then open the shunt-circuit.

4. In a system of electrical distribution, an electric battery-circuit, a dynamo-circuit electrically connected to the battery-circuit, a normally open electric switch connected to the dynamo and battery, a normally closed switch connected in shunt with the dynamo-circuit, and separate electrical devices influenced by the current flowing in the dynamo-circuit for first closing the open switch and immediately thereafter opening the closed switch.

5. In a system of electrical distribution, a storage battery and a dynamo electrically connected to charge the battery, a normally open electric switch connected to the battery and to the dynamo, a normally closed electric switch connected to the dynamo, and separate devices controlled by the dynamo-current for closing one switch and opening the other as the current of the dynamo rises and lowers.

6. In a system of electrical distribution, a storage battery and a dynamo electrically connected to charge the battery, separate electromagnets connected in the charging-circuit, one of the magnets having a separate winding of comparatively fine wire in shunt with the charging-circuit, a closed switch in the shunt-circuit, and a second electric switch in the charging-circuit controlled by the rise and fall of the current in the dynamo-circuit, the former switch being controlled by the latter switch.

7. In a system of electrical distribution, a storage battery, and a dynamo electrically connected to charge the battery, in combination with two electromagnets in the dynamo-circuit, an iron yoke connecting similar poles of the cores of the magnets, separate electric switches including armatures for the magnets, one of the switches being normally open and in the charging-circuit and the other being closed and in shunt with the dynamo, said armatures being magnetically connected to each other and to the yoke for the purpose described.

8. In a system of electrical distribution, a storage battery, and a dynamo electrically connected to charge the battery, in combination with two electromagnets in the dynamo-circuit, an iron yoke connecting similar poles of the cores of the magnets, an iron post in magnetic connection with the yoke, separate electric switches including armatures for the magnets mounted on the post and electrically connected to each other and to the post, one of the switches being normally open and in the charging-circuit and the other normally closed and in shunt with the dynamo for the purpose set forth.

In witness whereof I have hereunto set my hand this 23d day of May, 1902.

ALBERT E. DOMAN.

Witnesses:
   H. E. CHASE,
   G. S. DOMAN.